(12) United States Patent
Renteria

(10) Patent No.: US 12,043,377 B2
(45) Date of Patent: Jul. 23, 2024

(54) ROTATABLE THRUSTER AIRCRAFT

(71) Applicant: Joseph Raymond Renteria, Beaumont, CA (US)

(72) Inventor: Joseph Raymond Renteria, Beaumont, CA (US)

( * ) Notice: Subject to any disclaimer, the term of this patent is extended or adjusted under 35 U.S.C. 154(b) by 542 days.

(21) Appl. No.: 17/167,686

(22) Filed: Feb. 4, 2021

(65) Prior Publication Data

US 2021/0371097 A1 Dec. 2, 2021

Related U.S. Application Data

(63) Continuation-in-part of application No. 15/884,238, filed on Jan. 30, 2018, now abandoned.

(60) Provisional application No. 62/970,415, filed on Feb. 5, 2020.

(51) Int. Cl.
| | |
|---|---|
| *B64C 29/00* | (2006.01) |
| *B64C 39/02* | (2023.01) |
| *B64U 10/25* | (2023.01) |
| *B64U 30/10* | (2023.01) |
| *B64U 30/20* | (2023.01) |

(52) U.S. Cl.
CPC ........ *B64C 29/0033* (2013.01); *B64C 39/024* (2013.01); *B64U 10/25* (2023.01); *B64U 30/10* (2023.01); *B64U 30/20* (2023.01)

(58) Field of Classification Search
CPC ... B64C 29/0033; B64C 39/024; B64C 25/10; B64C 27/02; B64C 27/04; B64C 27/20; B64C 27/26; B64C 27/28; B64C 29/0025; B64C 29/02; B64C 29/0075; B64C 11/00; B64C 3/38; B64C 5/08; B64U 10/25; B64U 30/10; B64U 30/20

See application file for complete search history.

(56) References Cited

U.S. PATENT DOCUMENTS

| | | | | | |
|---|---|---|---|---|---|
| 2,063,030 | A | * | 12/1936 | Crouch | B64C 3/385 244/65 |
| 3,039,719 | A | * | 6/1962 | Platt | B64C 29/0033 244/12.4 |
| 3,059,876 | A | * | 10/1962 | Platt | B64C 29/0033 244/7 C |
| 3,231,221 | A | * | 1/1966 | Platt | B64C 29/0033 244/66 |
| 3,578,263 | A | * | 5/1971 | Gunter | B64C 29/0033 244/7 A |
| 3,884,431 | A | * | 5/1975 | Burrell | B64C 27/24 244/12.3 |
| 3,900,176 | A | * | 8/1975 | Everett | B64C 27/30 244/6 |
| 5,244,167 | A | * | 9/1993 | Turk | B64C 19/00 244/23 B |

(Continued)

*Primary Examiner* — Medhat Badawi
(74) *Attorney, Agent, or Firm* — Olav M. Underdal; IDP Patent Services

(57) ABSTRACT

A rotatable thruster aircraft includes an airframe, which includes an aircraft body and a fixed wing; rotatable thruster assemblies, each including first and second thrusters that provide rotation via differential thrust; a rotatable shaft with torsional flexibility; an inertial measurement unit; optionally vertical lift thrusters; and an aircraft control unit, including a processor, a non-transitory memory, an input/output component, and a power manager that controls specific power applied to the thrusters.

15 Claims, 7 Drawing Sheets

(56) References Cited

U.S. PATENT DOCUMENTS

| | | | | |
|---|---|---|---|---|
| 5,839,691 | A * | 11/1998 | Lariviere | B64C 27/605 244/17.23 |
| 6,367,736 | B1 * | 4/2002 | Pancotti | B64C 29/0033 244/7 C |
| 6,464,166 | B1 * | 10/2002 | Yoeli | B64C 27/20 244/12.3 |
| 6,561,455 | B2 | 5/2003 | Capanna | B64C 29/02 244/7 B |
| 6,568,630 | B2 * | 5/2003 | Yoeli | B64C 11/001 244/12.3 |
| 6,896,221 | B1 * | 5/2005 | Einarsson | B64C 5/08 244/12.4 |
| 7,032,861 | B2 * | 4/2006 | Sanders, Jr. | B64C 39/024 244/12.1 |
| 7,267,300 | B2 * | 9/2007 | Heath | B64D 35/04 244/12.3 |
| 7,281,680 | B2 * | 10/2007 | Melkuti | B64C 29/0025 244/12.5 |
| 7,472,863 | B2 * | 1/2009 | Pak | B64D 35/04 244/12.5 |
| 7,699,260 | B2 * | 4/2010 | Hughey | B64C 27/08 244/17.11 |
| 7,753,309 | B2 * | 7/2010 | Garreau | B64C 29/0033 244/12.4 |
| 7,871,035 | B2 * | 1/2011 | Arel | B64B 1/06 244/30 |
| 8,256,704 | B2 * | 9/2012 | Lundgren | B64C 39/04 244/7 C |
| 8,496,200 | B2 * | 7/2013 | Yoeli | B64C 29/0025 244/23 B |
| 8,733,690 | B2 * | 5/2014 | Bevirt | B64C 29/0033 244/17.23 |
| 8,931,729 | B2 * | 1/2015 | Abde Qader Alzu'bi | B64C 27/20 244/17.23 |
| 9,139,299 | B2 * | 9/2015 | Lundgren | B64C 37/00 |
| 9,187,174 | B2 * | 11/2015 | Shaw | B64C 27/28 |
| 9,272,784 | B2 * | 3/2016 | Nelson | B64C 39/024 |
| 9,528,375 | B2 * | 12/2016 | Alber | F01D 5/02 |
| 9,567,088 | B2 * | 2/2017 | Godlasky | B64C 29/02 |
| 9,623,967 | B2 * | 4/2017 | Mallard | B64C 39/024 |
| 9,643,720 | B2 * | 5/2017 | Hesselbarth | B64C 11/46 |
| 9,694,911 | B2 * | 7/2017 | Bevirt | B64C 29/0033 |
| 9,821,909 | B2 * | 11/2017 | Moshe | B64C 27/22 |
| 9,834,305 | B2 * | 12/2017 | Taylor | B64C 29/00 |
| 10,011,349 | B2 * | 7/2018 | Ivans | B64C 5/08 |
| 10,131,426 | B2 * | 11/2018 | Judas | B64C 5/08 |
| 10,137,982 | B1 * | 11/2018 | Dormiani | B64C 27/26 |
| 10,252,797 | B2 * | 4/2019 | Vondrell | B64C 27/08 |
| 10,301,016 | B1 * | 5/2019 | Bondarev | B64C 29/0033 |
| 10,370,095 | B2 * | 8/2019 | Won | B64D 27/06 |
| 10,399,673 | B1 * | 9/2019 | Roop | B64C 3/30 |
| 10,737,797 | B2 * | 8/2020 | Murrow | B64D 27/24 |
| 11,465,739 | B2 * | 10/2022 | Hymer | B64C 27/22 |
| 11,511,854 | B2 * | 11/2022 | Baity | B64U 30/10 |
| 11,520,356 | B2 * | 12/2022 | Hesselbarth | G05D 1/0858 |
| 2009/0084890 | A1 * | 4/2009 | Reinhardt | B64C 29/0033 244/12.4 |
| 2010/0044506 | A1 * | 2/2010 | Smith | B64C 25/10 244/101 |
| 2010/0243820 | A1 * | 9/2010 | Lim | B64C 27/30 244/7 A |
| 2010/0301168 | A1 * | 12/2010 | Raposo | G05D 1/0858 244/171.2 |
| 2011/0042508 | A1 * | 2/2011 | Bevirt | B64C 39/024 244/75.1 |
| 2011/0315827 | A1 * | 12/2011 | Collins | B64C 29/0033 244/7 A |
| 2012/0179308 | A1 * | 7/2012 | Peters | G05D 1/0858 701/99 |
| 2012/0248259 | A1 * | 10/2012 | Page | B64U 50/14 244/7 B |
| 2012/0261523 | A1 * | 10/2012 | Shaw | B64C 29/0033 244/7 R |
| 2014/0008485 | A1 * | 1/2014 | Lundgren | A63H 27/12 244/17.23 |
| 2014/0158815 | A1 * | 6/2014 | Renteria | B64C 39/04 244/12.1 |
| 2015/0028151 | A1 * | 1/2015 | Bevirt | B64D 27/24 244/6 |
| 2015/0210388 | A1 * | 7/2015 | Criado | B64C 39/024 244/6 |
| 2015/0274289 | A1 * | 10/2015 | Newman | B64C 29/0008 244/12.4 |
| 2016/0236775 | A1 * | 8/2016 | Eshkenazy | B64C 29/0025 |
| 2016/0311529 | A1 * | 10/2016 | Brotherton-Ratcliffe | B64C 27/30 |
| 2016/0347447 | A1 * | 12/2016 | Judas | B64U 30/297 |
| 2017/0191495 | A1 * | 7/2017 | Bordoni | F04D 29/325 |
| 2018/0006597 | A1 * | 1/2018 | Patnude | F24S 30/425 |
| 2018/0044011 | A1 * | 2/2018 | Reichert | B64C 39/062 |
| 2018/0215465 | A1 * | 8/2018 | Renteria | B64C 25/10 |
| 2020/0010182 | A1 * | 1/2020 | Renteria | B64C 39/024 |
| 2021/0371097 | A1 * | 12/2021 | Renteria | B64C 39/024 |

* cited by examiner

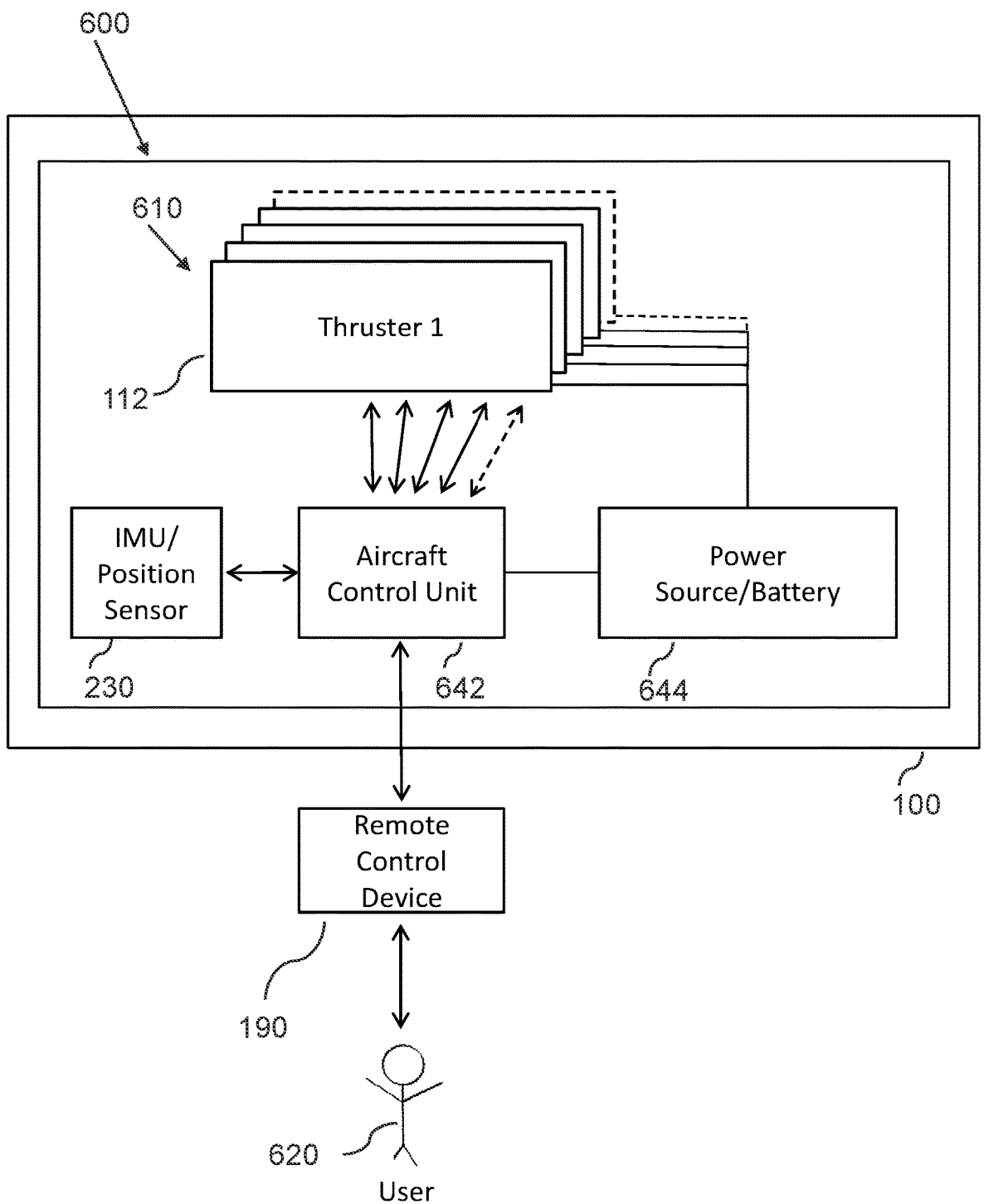

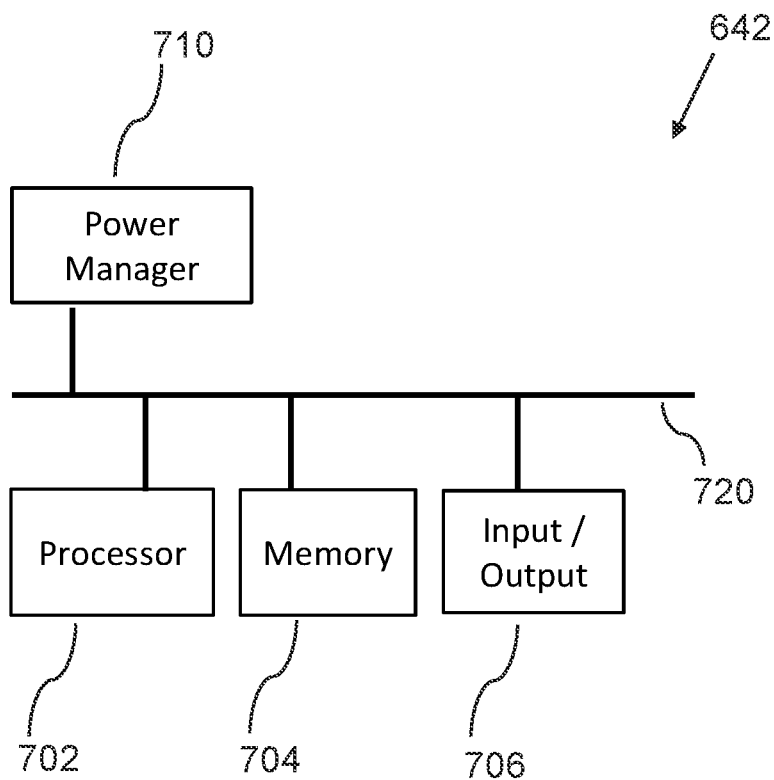

ROTATABLE THRUSTER AIRCRAFT

CROSS-REFERENCE TO RELATED APPLICATIONS

This U.S. Non-Provisional application claims priority to U.S. Provisional Application 62/970,415, filed Feb. 5, 2020; and is a Continuation-In-Part of U.S. Non-Provisional application Ser. No. 15/884,238, filed Jan. 30, 2018; both of which are hereby incorporated herein by reference in their entirety.

FIELD OF THE INVENTION

The present invention relates generally to the field of propulsion systems for vertical take-off and landing aircraft, and more particularly to methods and systems for aircraft with rotatable thruster assemblies, which are able to provide lift during both vertical and horizontal flight.

BACKGROUND OF THE INVENTION

In the world of aviation there are many different types of VTOL/fixed wing systems. So far, the most successful designs have been tilt rotor craft, which have the advantage of using one propulsion system through all envelopes of flight. Separate lift and thrust systems have gained a lot of popularity in recent years. These systems have two separate and optimized propulsion systems, one dedicated to vertical flight and the other to horizontal. The drawback here is that one system must carry the other as dead weight when not in use.

As such, considering the foregoing, it may be appreciated that there continues to be a need for novel and improved devices and methods for tilt rotor aircrafts.

SUMMARY OF THE INVENTION

The foregoing needs are met, to a great extent, by the present invention, wherein in aspects of this invention, enhancements are provided to the existing model of tilt rotor aircrafts.

In an aspect, a rotatable thruster aircraft can include:
a) at least one fixed wing; and
b) a right rotatable thruster assembly, including:
a right rotatable structure, which is rotatably connected to the fixed wing on a right side of a longitudinal axis of the rotatable thruster aircraft;
a first right thruster, which is connected to the right rotatable structure on a first side of an axis of rotation of the right rotatable structure; and
a second right thruster, which is connected to the right rotatable structure on a second side of the axis of rotation of the right rotatable structure;
such that the right rotatable thruster assembly is rotatable from a right first position providing a first downward vertical thrust to a right second position providing a first rearward horizontal thrust; and
c) a left rotatable thruster assembly, comprising:
a left rotatable structure, which is rotatably connected to the fixed wing on a left side of a longitudinal axis of the rotatable thruster aircraft;
a first left thruster, which is connected to the left rotatable structure on a first side of an axis of rotation of the left rotatable structure; and
a second left thruster, which is connected to the left rotatable structure on a second side of the axis of rotation of the left rotatable structure;
such that the left rotatable thruster assembly is rotatable from a left first position providing a second downward vertical thrust to a left second position providing a second rearward horizontal thrust.

In a related aspect, a rotatable thruster aircraft can be configured such that the right rotatable thruster assembly includes:
a first right thruster, which is connected to the right rotatable structure on a first side of the center of rotation of the right rotatable structure; and
a second right thruster, which is connected to the right rotatable structure on a second side of the center of rotation of the right rotatable structure;
such that the right rotatable thruster assembly is rotatable via application of a first differential thrust of the first and second right thrusters; and
the left thruster assembly includes:
a first left thruster, which is connected to the left rotatable structure on a first side of the center of rotation of the left rotatable structure; and
a second left thruster, which is connected to the left rotatable structure on a second side of the center of rotation of the left rotatable structure;
such that the at least one left rotatable thruster assembly is rotatable via application of a second differential thrust of the first and second left thrusters.

In another related aspect, the rotatable thruster aircraft can be configured such that the right rotatable thruster assembly is connected to a right tip of the at least one fixed wing, and the left rotatable thruster assembly is connected to a left tip of the at least one fixed wing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a schematic diagram illustrating a rotatable thruster system, according to an embodiment of the invention.

FIG. 7 is a schematic diagram illustrating an aircraft control unit, according to an embodiment of the invention.

DETAILED DESCRIPTION

Figure 1A:
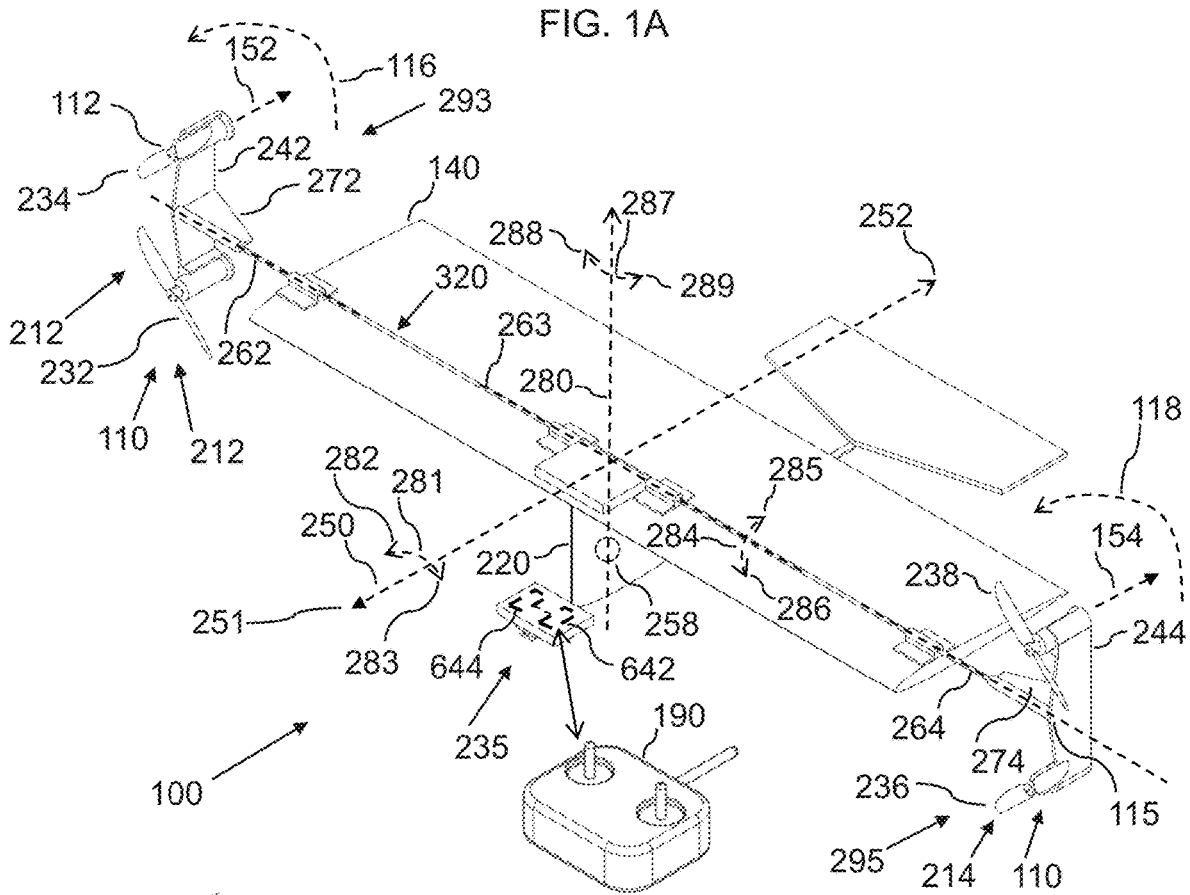
FIG. 1A is a perspective view of a rotatable thruster aircraft, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a rotatable thruster aircraft 100 with reference to FIG. 1A, in such manner that like reference numerals refer to like components throughout; a convention that we shall employ for the remainder of this specification.

In a related embodiment, a rotatable thruster aircraft 100 includes a tilt rotor system utilizing at least one wing 140 and two or more independently rotatable thruster assemblies 110. In a simple embodiment, the thruster assemblies 110 are comprised of a rotatable structure 244 and multiple thrusters 112 distributed across the pivot point 115 of the thruster assembly, allowing the thrusters 112 to position the thruster assemblies 110 through differential thrust, such that the thruster assemblies 110 can rotate 116, 118 to a preferred orientation, which for example can be either configured for vertical thrust 162, 164 or horizontal thrust 152, 154, or a combination thereof. In a simple embodiment, the thruster assemblies 110 can be connected to the tips of the wing 140, which serves as the main body of the aircraft 100 in the form of a flying wing 100 or the wing may have a connected canard or empennage. In such a simple embodiment, the wing 140 and any connected fuselages 220 (shown in FIG. 1A), stabilizers or other structures is stabilized passively by gravity and/or any relative wind. In the simple embodiment where the airframe 235 is passively stabilized, wheeled landing gear or skids may be attached to any canards, empennages or other structures to accommodate various landing positions.

In various embodiments, the rotatable thruster aircraft 100 implements a tilt thruster/rotor system, which may also take advantage of dedicated vertical lift propulsion, such that it is possible to create a VTOL that uses all available thrust during vertical takeoff with the option of reducing the amount of dead weight carried by the aircraft during horizontal flight. Furthermore, the various embodiments of the present invention are able to accomplish this without using any actuators, with an absolute minimum of moving parts and at the same time provide the option of propulsion redundancy to improve reliability and safety. Finally, this system may be integrated into an aircraft without the need for heavy structural reinforcement, since vertical lift stresses may be distributed along the span of the aircraft.

In various embodiments, a rotatable thruster aircraft 100, which can also be referred to as a rotatable thruster vehicle 100, a tilt thruster aircraft 100, or a tilt thruster vehicle 100, can include all types of flying devices 100, including airplanes 100, and remote-controlled drones 100, but in some embodiments can include other types of vehicles 100, that may benefit from rotatable thruster assemblies 110, such as for example remote-controlled power boats 100, cars 100, submersibles 100, such as a drone submarine, etc. Various other embodiments can include flying devices that may benefit from having rotatable thruster assemblies 110, such as novelty flying devices, including flying fish, arrows, hoverboards and other unique configurations.

In related embodiments, the rotatable thruster aircraft 100 can be configured with landing gear, landing legs, or other type of devices to allow the aircraft 100 to be stably landed or stably positioned on a ground surface.

In related embodiments, the thrusters 112 can be turbines, propellers, or rotors, or other forms of propulsion mechanisms that generates thrust.

In related embodiments, the thrusters 112 may be powered by electric power, such that each thruster includes an electric engine, which receives electric power from at least one electric power source, such as a battery. However, in alternative embodiments, mechanical power may be transferred to each thruster, via axles, chain, or belt mechanical transfer, from at least one engine, such as an electrical or combustion engine.

In a related embodiment, thruster assemblies 110 may take the form of a section of the wing, providing lift during forward flight. By rotating the nacelles, the wing section may provide lift and also act as a control surface during horizontal flight. This may eliminate the need for additional control surfaces and actuators.

Figure 4:
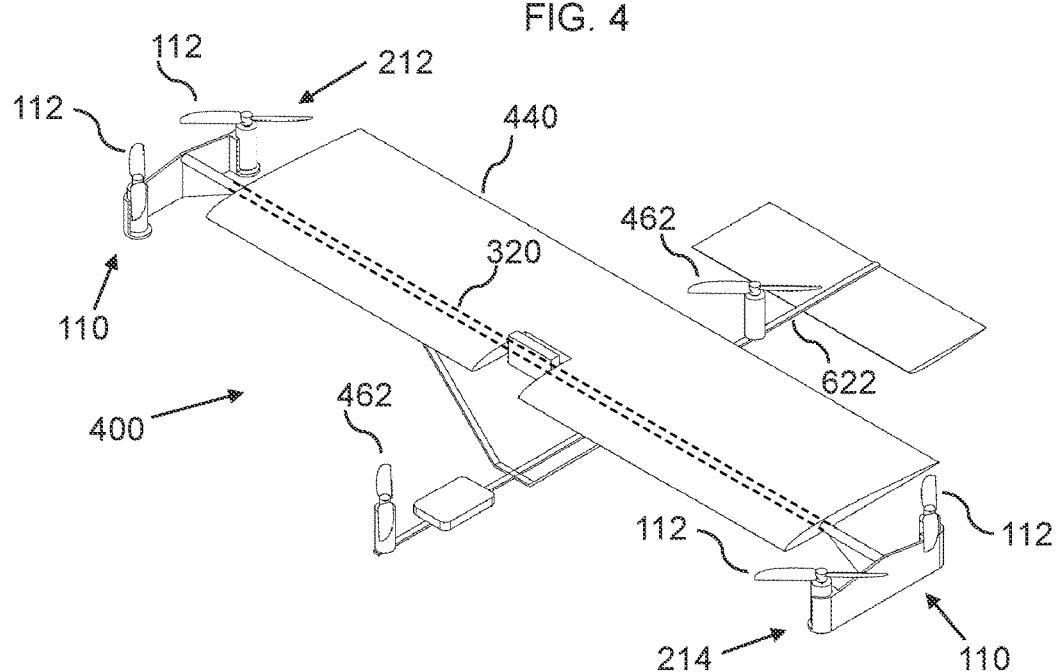
FIG. 4 is a perspective view of a rotatable thruster aircraft, according to an embodiment of the invention.

In other related embodiments, thrusters may be any variety of thrust producing device. In such an embodiment, thrusters 112 can include electric motors and propellers, which are sped up or slowed down by a flight control computer to provide stability control. As shown in FIG. 4, vertical lift thrusters 462 and rotatable thruster assemblies 110 may work together to provide propulsion and stability during all flight modes. Thrusters 462 which are dedicated to vertical lift may be optimized for static thrust and may be less powerful than standard SLT systems, since they are assisted by the rotatable thrusters 110, saving energy and weight. Rotatable thrusters 110 may be optimized for dynamic thrust and may be less powerful than would be required by a conventional tilt rotor only system, since they will be assisted by the dedicated vertical lift thrusters 462 during vertical takeoff and landing (VTOL), saving weight and increasing efficiency during forward flight. One beneficial feature of the described hybrid SLT/tilt rotor system is that there is much opportunity for optimization and redundant propulsion. Some thrusters 112 may be powered down during horizontal flight to save power, a popular concept in the field of electric VTOL flight. Various thrusters 112 can be optimized for specific roles while still being able to contribute to other roles. Coaxial thrusters may be used to provide a compact static thrust propulsion system for vertical lift as well as an efficient dynamic thrust propulsion system during forward flight.

In various embodiments, thruster assemblies 110 can be standard, actuated structures using a single thruster or differential thrust controlled multi-thruster configurations. The latter option, using differential thrust for rotation, can be beneficial in that it eliminates the weight and complexity of an actuated system, while also lending itself nicely to increased efficiency and redundant propulsion systems, namely multiple electrically powered rotors. Thruster assemblies 110 may be positioned using a variety of positioning sensors.

In other various embodiments, wings 140 may be in a variety of configurations. In a related embodiment, the wings 140 serve as a mounting structure for both the vertical lift thrusters 462 and the rotatable thrusters 110, although thrusters may be mounted to a variety of structures which allow them to be connected to the airframe 235. In such an embodiment, the vertical lift thruster 462 can be connected to booms 622 which are then longitudinally attached to the wing, similar to what is the common method of attaching motors to conventional SLT systems. The rotatable thruster assemblies 110 can be attached to the wing tips and pivot to provide yaw control during hover and roll and pitch control during horizontal flight. Conventional wing and tailplane and canard configurations as well as tandem wing and triple surface configurations can be used. In tandem and triple wing configurations, it is possible to allow two or more wings/surfaces to share the same longitudinal boom structure 622 to allow the thrusters to be mounted on so that they may lift the aircraft 300 vertically. Because the vertical lift thrusters 462 and the rotatable thrusters 110 can be mounted directly to the wing, they can be distributed along the span of the wing 140 and so divide the stress of lifting the wing along the span of the wing which is very structurally efficient.

In various related embodiments, ideally, aircraft control is provided through differential thrust during all modes of flight to increase simplicity and save weight. However, conventional control surfaces and other methods can also be used. Hybrid fuel/electric systems can also be used, for example, the vertical lift thrusters 462 can be shaft driven by a turbine or other engine, while the rotatable thruster 110 can be electrically powered, or the turbine or engine can be configured to generate power for the electrically powered thrusters 112. In some embodiments, the VTOL aircraft 100 can be equipped with landing gear, which enables the aircraft to perform both VTOL and CTOL. Electrically powered, redundant rotors 112 can used for the rotatable thrusters, such that some of the rotatable thrusters 112 can be shut down during horizontal flight and they may use foldable props to reduce drag. The described methods may be used to enable VTOL for a manned or unmanned aircraft. Fairing or shrouding may be utilized to provide enhanced aerodynamics to vertical lift systems when not in use. Folding propellers may also be utilized for vertical lift thrusters, allowing the propeller blades to passively swing rearward when not in use during horizontal flight. Thruster assemblies 110 may be positioned by actuators, springs, magnets, pendulum effect or other methods when not in use. They may also be axially connected to an airframe 235 by brushless or stepper motors for positioning purposes. During forward flight, thruster assemblies may be held in place using a large variety of mechanical and electromechanical methods, enabling complete stability of thruster assemblies and allowing rotors to be powered off while maintaining horizontal flight nacelle positioning.

In a related embodiment, a rotatable thruster assembly 110 can be configured to passively rotate to be positioned for vertical take-off, when not in use. In a further related embodiment, the rotatable thruster assembly 110 can be configured with a center of mass 258 that is offset from the axis of rotation 262 of the rotatable thruster assembly 110, such that the rotatable thruster assembly 110 is in a vertical take-off position, when the rotatable thruster assembly 110 is rotated by gravity to a position with the center of mass in a lowest position. The center of mass can be configured in the rotatable winglet 272, but can also be configured in other parts of the rotatable thruster assembly 110. In alternative embodiments, the passive rotation to a neutral position for vertical takeoff can for example be implemented via use of springs, magnets, or other related gravity/pendulum configurations.

In another related embodiment, while each wing 140 on an aircraft 100 provides an ideal structure for vertical lift and rotatable thruster mounting, it is not a requirement. For example, a wing may have no thrusters at all, or it may have only vertical lift or only rotatable thrusters or both.

In yet another related embodiment, it is also possible to create a configuration using only one or more pivotable/rotatable thruster assemblies 110, where the one or more thruster assemblies 110 are centrally located adjacent to the center of mass of the aircraft, which is then stabilized by dedicated vertical lift thrusters 462.

In a related embodiment, as shown in FIG. 1A, a rotatable thruster aircraft 100 can include a conventional wing and tailplane configuration, with a thruster assembly 110 attached to each wingtip. Each thruster assembly 110 has multiple thrusters 112 distributed across the pivot point 115 of the thruster assembly, which collectively produces a thrust vector 154 while also controlling the position of the thruster assembly 110. Each thruster assembly 110 contains a positioning sensor and pivots independently from the other thruster assembly 110 and of the aircraft. The main body 220 of the aircraft is passively stabilized and is affected by gravity and any relative wind.

In a related embodiment, each thruster assembly 110 can include multiple thrusters 112 distributed across the pivot point 115 of the thruster assembly 110, which collectively produce a thrust vector 154 while also controlling the position of the thruster assembly 110. Each thruster assembly 110 can include a positioning sensor and pivots independently from the other thruster assembly.

In a related embodiment, thrusters 112 can be electrically driven propellers. Propeller disks can be arranged to overlap resulting in a very compact, differential thrust controlled, rotatable thruster assembly.

In a related embodiment a rotatable thruster aircraft 100 can be configured with ducted/shrouded turbine fans or rotors.

In a related embodiment, a rotatable thruster aircraft can further include at least one unpowered rotor, which is configured to rotate and provide lift during forward flight, such that the rotatable thruster aircraft can be configured as an a utogyro/gyrocopter.

In a related embodiment, as shown in FIG. 1A, the rotatable thruster aircraft 100 can further include an aircraft control unit 642, which can be mounted in the airframe 235, including aircraft body/fuselage 220, for example in a main body 220, wherein the aircraft control unit 642 is configured to control a specific power applied for each thruster 112 in a rotatable thruster assembly 110.

In a further related embodiment, as shown in FIG. 1A, the rotatable thruster aircraft 100 can be configured to communicate, via the aircraft control unit 642 with a remote control device 190, such that a user 620 can use the remote control device 190 to control the rotatable thruster aircraft 100.

In an embodiment, as shown in FIG. 6, a tilt rotor system 600 can include:
 a) a plurality of rotatable thruster assemblies 610, including a plurality of thrusters 112;
 b) a power source 644, such as a battery 644;
 c) an inertial measurement unit/position sensor 230, which can be connected to the rotatable shaft 320 (or a selected rotatable thruster assembly 212, 214, 610), such that the inertial measurement unit/position sensor 230 is configured to measure a position of the rotatable shaft 320 (or a selected rotatable thruster assembly 212, 214, 610); and
 d) an aircraft control unit 642, which can be mounted in a main body of the aircraft 100;
 wherein the aircraft control unit 642 is configured to control a specific power applied for each thruster 112 in the plurality of thrusters 112, wherein the specific power applied for each thruster is provided by the power source 644. The inertial measurement unit/position sensor 230 can alternatively be a component of the aircraft control unit 642

In a related embodiment, as shown in FIG. 7 the aircraft control unit 642 can further include:
 a) a processor 702;
 b) a non-transitory memory 704;
 c) an input/output component 706; and
 d) a power manager 710 (that can also be referred to as a flight manager 710), which is configured to control the specific power applied for each thruster 112 in the right and left rotatable thruster assemblies 212, 214; all connected via
 e) a data bus 720.

Figure 3:
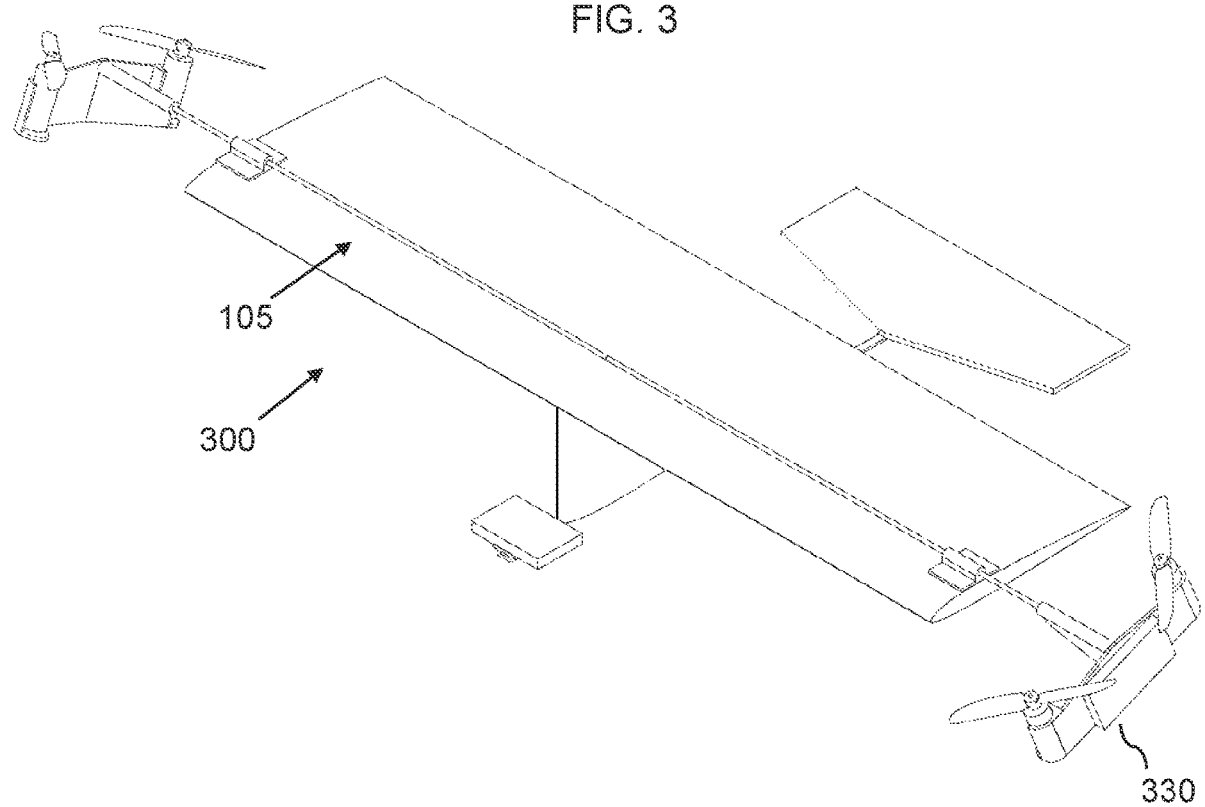
FIG. 3 is a perspective view of a rotatable thruster aircraft, according to an embodiment of the invention.

In related embodiments, the flight manager 710 can execute flight control software that is loaded into memory 704, and the aircraft control unit 642 can further include (or communicate with) flight control/avionic systems/components such as accelerometers, gyros, barometer, GPS, etc. As shown in FIG. 1C, the rotatable thruster aircraft 100 can further include rotary position sensors, such as hall effect sensors to determine the position the nacelles, which can be positioned between the wings and rotatable thruster assemblies 212, 214. The rotatable thruster assemblies 212, 214 can further include inertial measurement unit (IMU) sensors 330 (as shown in FIG. 3) for determining the position of the rotatable thruster assemblies 212, 214. The control unit 642 can further include an IMU sensor for determining the position of the main body. The rotatable thruster assemblies 212, 214 may take commands from the control unit 642, or in the case of a remotely controlled aircraft they may take commands directly from a remote control device 190. Rotary position sensors, or IMUs, or both may be used to determine rotatable thruster assembly 212, 214 position. In a further related embodiment, the flight manager 710 can be configured to calculate and control position of the rotatable thruster assembly 212, 214 and thrust output for each thruster 112 in the rotatable thruster assembly 212, 214, via an IMU/position sensor attached to the rotatable shaft 320, eliminating the requirement to have such sensors located within the rotatable thruster assembly 212, 214 itself.

Figure 1B:
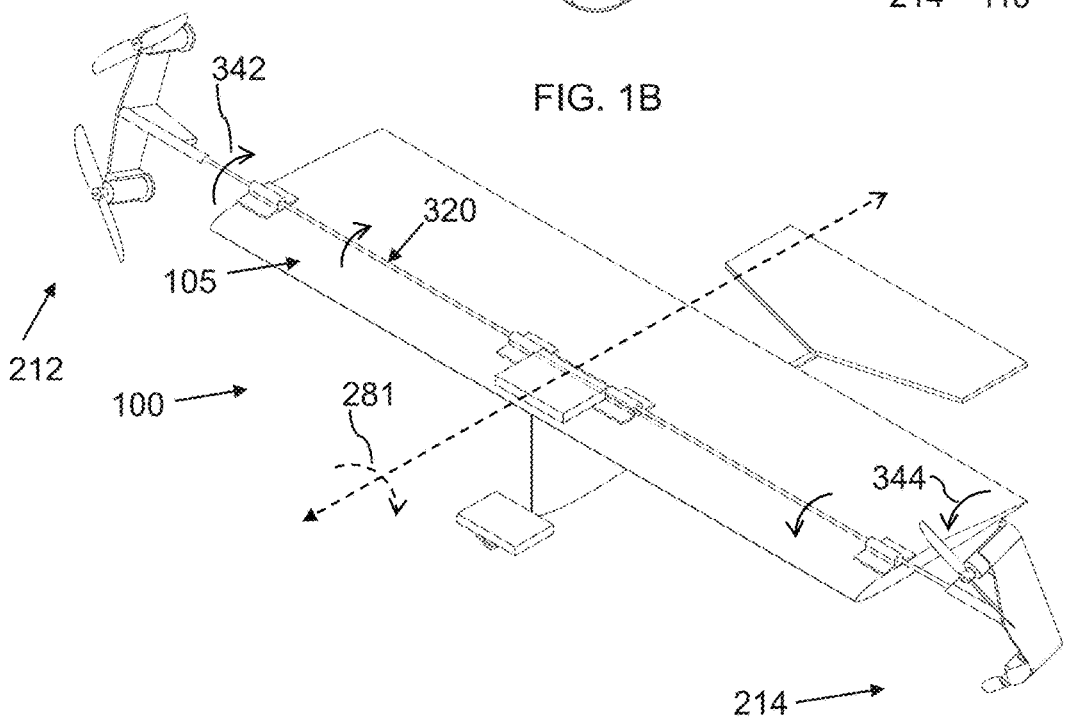
FIG. 1B is a perspective view of a rotatable thruster aircraft, according to an embodiment of the invention.
Figure 1C:
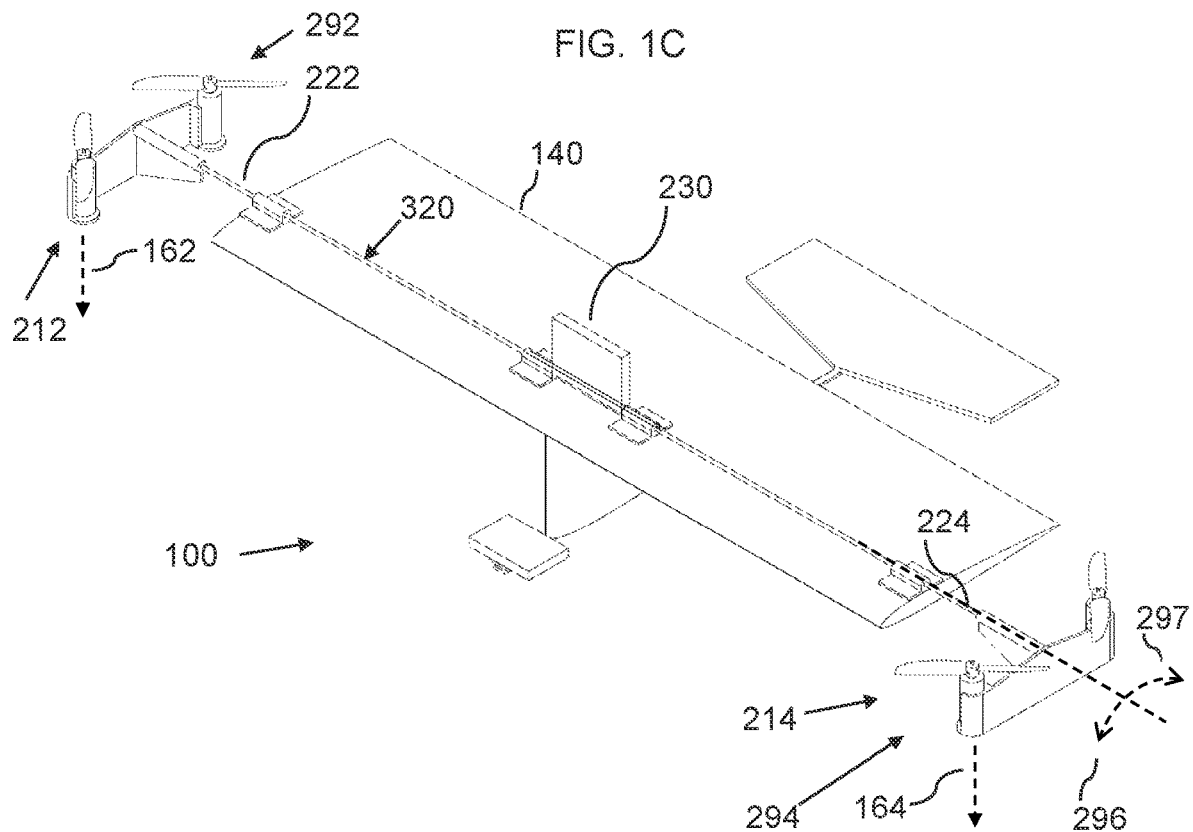
FIG. 1C is a perspective view of a rotatable thruster aircraft, according to an embodiment of the invention.
Figure 1D:
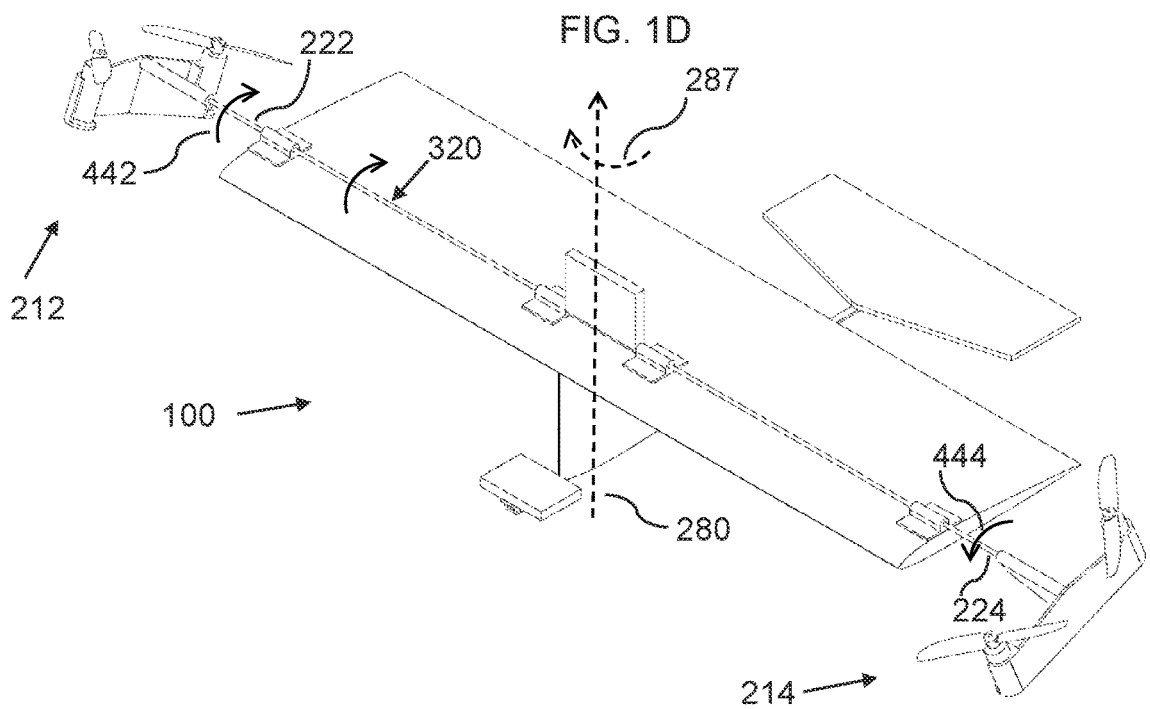
FIG. 1D is a perspective view of a rotatable thruster aircraft, according to an embodiment of the invention.

In a related embodiment, as shown in FIGS. 1A-1D the rotatable thruster aircraft 100 can be configured with solely one right rotatable thruster assembly 212 and solely one left rotatable thruster assembly 214, wherein one or more aircraft control units 642 mounted on the main body 220 are configured to determine and control the position of the main body 220, as well as the positions and thrust outputs of the right and left rotatable thruster assemblies 212, 214 in relation to the main body 220 during vertical flight 280, as shown in FIGS. 1C and 1D, such that:
 a) a yaw movement 287 of the main body 220 indicates the positions of the right and left rotatable thruster assemblies 212, 214 relative to each other, such that a positive/right yaw 288 indicates that the left rotatable thruster assembly 214 is pitched forward relative to the right rotatable thruster assembly 212, and a negative/left yaw 289 indicates that the right rotatable thruster assembly 212 is pitched forward relative to the left rotatable thruster assembly 214;
 b) a roll movement 281 of the main body 220 indicates the thrust outputs of the right and left rotatable thruster assemblies 212, 214 relative to each other, such that a positive/right roll 282 indicates that the left rotatable thruster assembly 214 is producing more thrust relative to the right rotatable thruster assembly 212, and a negative/left roll 283 indicates that the right rotatable thruster assembly is producing more thrust relative to the left rotatable thruster assembly; and
 c) a movement along a longitudinal axis 250 of the main body 220 indicates positions of the right and left rotatable thruster assemblies 212, 214 in relation to the main body 220, such that a forward motion 251 along the longitudinal axis 250 of the main body 220 indicates that the rotatable thruster assemblies 212, 214 are pitched forward 296 in relation to the main body 220, and a rearward motion 252 along the longitudinal axis 250 of the main body 220 indicates that the rotatable thruster assemblies 212, 214 are pitched rearward 297 in relation to the main body 220.

In another related embodiment, as shown in FIGS. 1A, 1C, and 1D the rotatable thruster aircraft 100 can be configured with solely one right rotatable thruster assembly 212 and solely one left rotatable thruster assembly 214, wherein one or more aircraft control units 642 mounted on the main body 220 are configured to determine and control the position of the main body, as well as the positions and thrust outputs of said right and left rotatable thruster assemblies in relation to the main body during horizontal flight 250, as shown in FIG. 1A, such that:
 a) a yaw movement 287 around the yaw/vertical axis 280 of the main body 220 indicates the thrust outputs of the right and left rotatable thruster assemblies 212, 214 relative to each other, such that a positive/right yaw 288 of the main body 220 indicates that the left rotatable thruster assembly 214 is producing more thrust relative to the right rotatable thruster assembly 212, and a negative/left yaw 289 of the main body 220 indicates that the right rotatable thruster assembly 212 is producing more thrust relative to the left rotatable thruster assembly 214;
 b) a movement around the roll axis 281 of the main body 220, indicates positions of the right and left rotatable thruster assemblies 212, 214 relative to each other, such that a positive/right roll 282 of the main body 220 indicates that the right rotatable thruster assembly 212 is pitched forward 296 relative to the left rotatable thruster assembly 214, and a negative/left roll 283 of the main body 220 indicates that the left rotatable thruster assembly 214 is pitched forward 296 relative to the right rotatable thruster assembly 212; and c) a pitch movement 284 of the main body, indicates the pitch of the right and left rotatable thruster assemblies 212, 214 in relation to the main body 220, such that a positive/upward pitch 285 of the main body 220 indicates that the rotatable thruster assemblies 212, 214 are pitched rearward 297 in relation to the main body 220, and a negative/downward pitch 286 of the main body 220 indicates that the rotatable thruster assemblies 212, 214 are pitched forward 296 in relation to the main body 220.

In some embodiments, vertical lift props may be of a foldable type, such that propeller blades swing out during use, allowing them to passively fold back and feather in the relative wind when not in use.

In some embodiments, the vertical lift thrusters 462 can provide a dominant portion of the vertical lift; but in other embodiments the vertical lift thrusters 462 may serve mainly as stabilizers, leaving the rotatable thruster assemblies 110 to provide the majority of the aircraft lift.

In an embodiment, as shown in FIGS. 1A, 1B, 1C, and 1D, a rotatable thruster aircraft 100 can include:

a) an airframe 235, which can include at least one fixed wing 140 and an aircraft body 220;

b) at least one right rotatable thruster assembly 212, comprising:
   a right rotatable structure 242, which is rotatably connected to the airframe 235, such as the fixed wing 140, on a right side of a longitudinal axis 250 of the rotatable thruster aircraft 100, 200 that intersects with a center of mass 258 of the rotatable thruster aircraft 100, 200;
   at least one right thruster 232, which is connected to the right rotatable structure 242, such that the at least one right thruster 232 is offset from an axis of rotation 282 of the right rotatable structure 242;
   such that the at least one right rotatable thruster assembly 212 is rotatable 116 from a right horizontal position 292 (as shown in FIG. 1C) providing a right downward vertical thrust 162 to a right vertical position 293 (as shown in FIG. 1A) providing a right rearward horizontal thrust 152; and c) at least one left rotatable thruster assembly 214, comprising:
   a left rotatable structure 244, which is rotatably connected to the fixed wing 140 on a left side of a longitudinal axis 250 of the rotatable thruster aircraft; and
   at least one left thruster 236, which is connected to the left rotatable structure 244, such that the at least one left thruster 236 is offset from an axis of rotation 264 of the at least one left rotatable structure;
   such that the at least one left rotatable thruster assembly 214 is rotatable 118 from a left horizontal position 294 (as shown in FIG. 1C) providing a left downward vertical thrust 164 to a left vertical position 295 (as shown in FIG. 1A) providing a left rearward horizontal thrust 154.

In a related embodiment, as shown in FIGS. 1A-1D, the at least one right thruster 232 can include:
   a first right thruster 232, which is connected to the right rotatable structure 242 on a first side of the axis of rotation 262 of the right rotatable structure 242; and
   a second right thruster 234, which is connected to the right rotatable structure 242 on a second side of the axis of rotation 262 of the right rotatable structure 242;
   such that the first and second right thrusters 232, 234 are oppositely connected to the right rotatable structure 242 with respect to the axis of rotation 262 of the right rotatable structure 242, i.e. on first and second ends of the right rotatable structure 242;
   such that the at least one right rotatable thruster assembly 212 is rotatable via application of a first differential thrust of the first and second right thrusters 232, 234;
   such that increased differential thrust of the first right thruster 232 relative to the second right thruster 234, causes a rotation toward the right first position 292 (only the left rotatable thruster assembly 214 is shown in the first position);
   such that increased differential thrust of the second right thruster 234 relative to the first right thruster 232, causes a rotation toward the right second position 294 (only the right rotatable thruster assembly 212 is shown in the second position); and wherein the at least one left thruster 236 comprises:
   a first left thruster 236, which is connected to the left rotatable structure 244 on a first side of the axis of rotation 264 of the left rotatable structure 244; and
   a second left thruster 238, which is connected to the left rotatable structure 244 on a second side of the axis of rotation 264 of the left rotatable structure 244;
   such that the first and second left thrusters 236, 238 are oppositely connected to the left rotatable structure 244 with respect to the axis of rotation 264 of the left rotatable structure 244, i.e. on first and second ends of the left rotatable structure 244;
   such that the at least one left rotatable thruster assembly 214 is rotatable via application of a second differential thrust of the first and second left thrusters 236, 238;
   such that increased differential thrust of the first left thruster 236 relative to the second left thruster 238, causes a rotation toward the left first position 292;
   such that increased differential thrust of the second left thruster 238 relative to the first left thruster 236, causes a rotation toward the left second position 294.

In another related embodiment, as shown in FIGS. 1A-1D, the at least one right rotatable thruster assembly 212 can be connected to a right tip of the at least one fixed wing 140, and the at least one left rotatable thruster assembly 214 can be connected to a left tip of the at least one fixed wing 140.

In another related embodiment, as shown in FIG. 1A:

a) the at least one right rotatable thruster assembly 212 can further include a right rotatable winglet 272, which is connected to the right rotatable structure 242, such that the right rotatable winglet 272 is configured to rotate with the right rotatable structure 242;
   such that the right rotatable winglet 272 is perpendicular to a forward direction of the rotatable thruster aircraft 200 when the at least one right rotatable thruster assembly 212 is in the right first position 292, whereby the right rotatable winglet is configured to function as an airbrake; such that the right rotatable winglet 272 is parallel to a forward direction of the rotatable thruster aircraft 200 when the at least one right rotatable thruster assembly 212 is in the right second position 294, whereby the right rotatable winglet 272 is configured to provide minimal drag; and b) the at least one left rotatable thruster assembly 214 further comprises a left rotatable winglet 274, which is connected to the left rotatable structure 244, such that the left rotatable winglet 274 is configured to rotate with the left rotatable structure 244;

such that the left rotatable winglet 274 is perpendicular to the forward direction of the rotatable thruster aircraft 200 when the at least one left rotatable thruster assembly 214 is in the left first position, whereby the left rotatable winglet 274 is configured to function as an airbrake;

such that the left rotatable winglet 274 is parallel to a forward direction of the rotatable thruster aircraft 200 when the at least one left rotatable thruster assembly 214 is in the left second position, whereby the left rotatable winglet 274 is configured to provide minimal drag.

In another related embodiment, each thruster 112 of the right and left rotatable thruster assemblies 110 can be a rotor.

In a related embodiment, as shown in FIG. 1A, a rotatable thruster aircraft 100 can further include an aircraft control unit 642, which can be mounted in the aircraft fuselage/body 220, wherein the aircraft control unit 642 can be configured to control a specific power applied for each thruster in the right and left rotatable thruster assemblies 212, 214.

In an embodiment, as shown in FIGS. 1A, 1B, 1C, and 1D, a rotatable thruster aircraft 100 can include:
a) an airframe 235, which can include aircraft fuselage 220 (or aircraft body/central structure 220) and an aircraft wing 140; and
b) at least one right rotatable thruster assembly 212, including:
a right rotatable structure 242, which is rotatably connected to the fixed wing 140 (or another part of the airframe 235) on a right side of a longitudinal axis 250 of the rotatable thruster aircraft 100, 200; and
at least one right thruster 232, which is connected to the right rotatable structure 242, such that the at least one right thruster 232 is offset from an axis of rotation 262 of the right rotatable structure 242;
such that the at least one right rotatable thruster assembly 212 is rotatable 116 from a right horizontal position 292 (as shown in FIG. 1C) providing a right downward vertical thrust 162 to a right vertical position 293 (as shown in FIG. 1A) providing a right rearward horizontal thrust 152; and
c) at least one left rotatable thruster assembly 214, including:
a left rotatable structure 244, which is rotatably connected to the fixed wing 140 on a left side of a longitudinal axis 250 of the rotatable thruster aircraft; and
at least one left thruster 236, which is connected to the left rotatable structure 244, such that the at least one left thruster 236 is offset from an axis of rotation 264 of the at least one left rotatable structure;
such that the at least one left rotatable thruster assembly 214 is rotatable 118 from a left horizontal position 294 (as shown in FIG. 1C) providing a left downward vertical thrust 164 to a left vertical position 295 (as shown in FIG. 1A) providing a left rearward horizontal thrust 154.

In a related embodiment, as shown in FIG. 1C, a rotatable thruster aircraft 100 can include:
a) two or more laterally opposite rotatable thruster assemblies 212, 214; and
b) a rotatable shaft 320;

wherein the opposite rotatable thruster assemblies 212, 214 are rigidly (i.e. non-rotatably) connected to opposite ends 222, 224 of the rotatable shaft 320, which is laterally mounted between the two rotatable thruster assemblies 212, 214. As shown, the rotatable thruster aircraft 100 can further include an inertial measurement unit 230 (positioning sensor 230), which is attached to the rotatable shaft 320. Alternatively, the inertial measurement unit 230 can be attached to any rotatable portion, including any part of the rotatable thruster assemblies 212, 214 or the rotatable shaft 320.

In a further related embodiment, as shown in FIG. 1D, wherein the at least one right rotatable thruster assembly 212 and the at least one left rotatable thruster assembly 214 can each be rigidly connected to the rotatable shaft 320, the rotatable shaft 320 can be configured with a torsional flexibility 442, 444, such that the rotatable shaft 320 functions as a torsion spring.

In a related embodiment, as shown in FIG. 1B, the at least one right rotatable thruster assembly 212 can be configured (via application of differential thrust) with a first direction twist 342 from a vertical orientation (of the right rotatable thruster assembly 212 as shown in FIG. 1A), and the at least one left rotatable thruster assembly 214 can be configured with a symmetrical opposite second direction twist 344 from the vertical orientation (of the left rotatable thruster assembly 214 as shown in FIG. 1A), such that a thrust from the at least one right rotatable thruster assembly 212 and the at least one left rotatable thruster assembly 214 provide a roll movement 281 of the rotatable thruster aircraft 100.

In another related embodiment, as shown in FIG. 1D, the at least one right rotatable thruster assembly 212 can be configured (via application of differential thrust) with a first direction twist 442 from a horizontal orientation (of the right rotatable thruster assembly 212 as shown in FIG. 1C), and the at least one left rotatable thruster assembly 214 is configured with a symmetrical opposite second direction twist 444 from the horizontal orientation (of the left rotatable thruster assembly 214 as shown in FIG. 1C), such that a thrust from the at least one right rotatable thruster assembly 212 and the at least one left rotatable thruster assembly 214 provide a yaw movement 287 of the rotatable thruster aircraft 100.

In a further related embodiment, as shown in FIG. 1D, the shaft can be configured as a torsional spring while also serving as a pivot point for the rotatable thruster assemblies 212, 214, such that the rotatable thruster assemblies 212, 214 are rotatably connected to the opposite ends 222, 224 of the rotatable shaft 320.

Figure 2A:
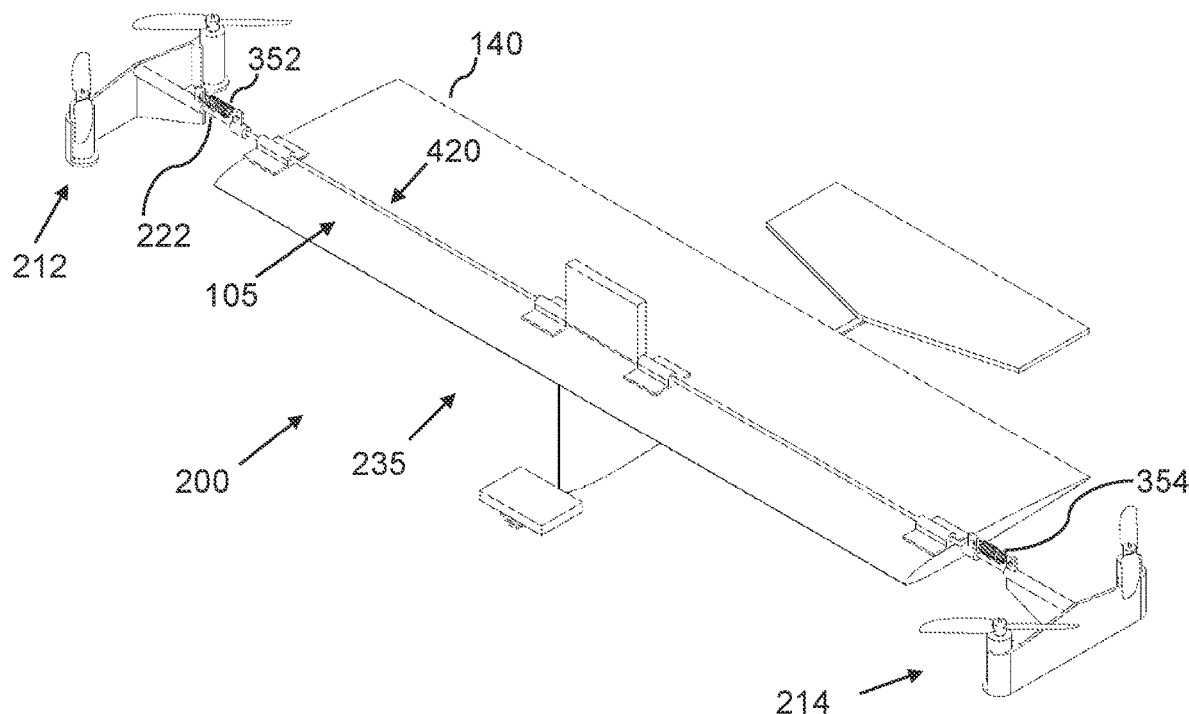
FIG. 2A is a perspective view of a rotatable thruster aircraft, according to an embodiment of the invention.
Figure 2B:
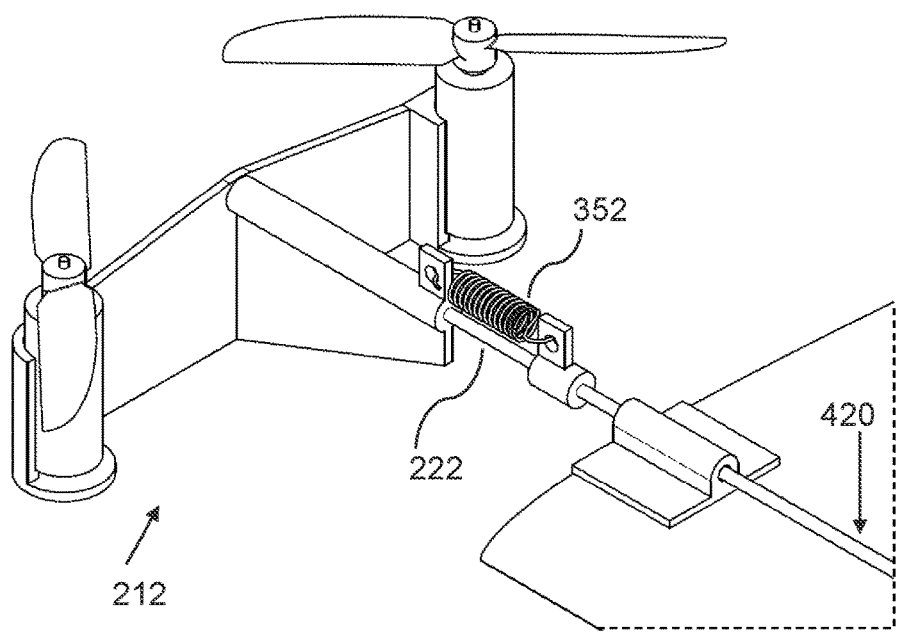
FIG. 2B is a perspective view of a rotatable thruster assembly mounted with a spring, according to an embodiment of the invention.
Figure 2C:
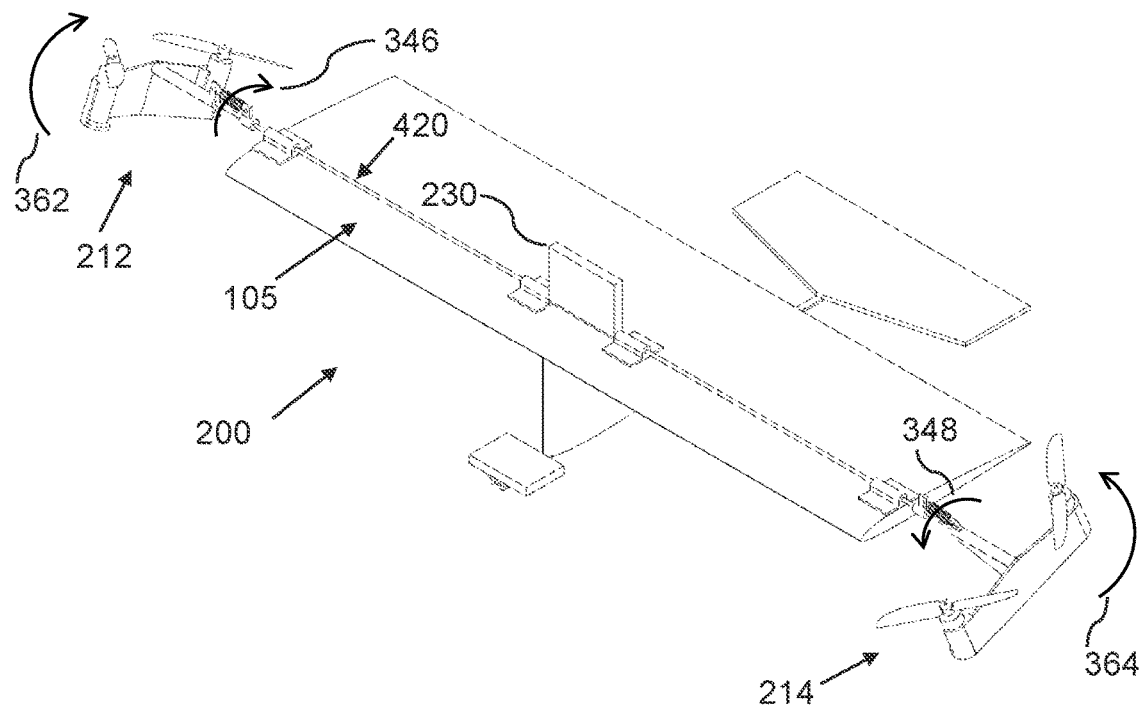
FIG. 2C is a perspective view of a rotatable thruster aircraft, according to an embodiment of the invention.

In a yet further related embodiment, as shown in FIGS. 2A, 2B, and 2C, the shaft 420 can be configured with torsional rigidity, having rotatable connections to the rotatable thruster assemblies, where the rotatable thruster assemblies are spring loaded and passively positioned in relation to the said shaft 420 with springs, elastics, wires or other components. As shown, the rotatable thruster aircraft 200 can further include right and left springs 352, 354, which are mounted between (and connected to) the rotatable shaft 420 and respectively the right and left rotatable thruster assemblies 212, 214, such that the right and left springs 352, 354, dampen rotation 362, 364 of respectively the right and left rotatable thruster assemblies 212, 214 as shown in FIG. 2C.

In a further related embodiment, as shown in FIGS. 1C, 2C and 3, the rotatable thruster aircraft 100, 200, 300 can further include at least one inertial measurement unit 230, 330 (including a positioning sensor 230, 330, such as an accelerometer 230, 330), which can be attached to the rotatable shaft 320 and/or one or more of the opposite rotatable thruster assemblies 212, 214. FIG. 3 shows the inertial measurement unit 330 mounted only on the left rotatable thruster assembly.

In a yet further related embodiment, the at least one inertial measurement unit 230, 330 can be configured to determine a rotational position of the opposite rotating thruster assemblies 212, 214, and to calculate an average rotational position of the rotatable thruster assemblies 212, 214, as an the average rotational position a sequence of rotational position measurements, recorded over a predetermined period of time.

Figure 5:
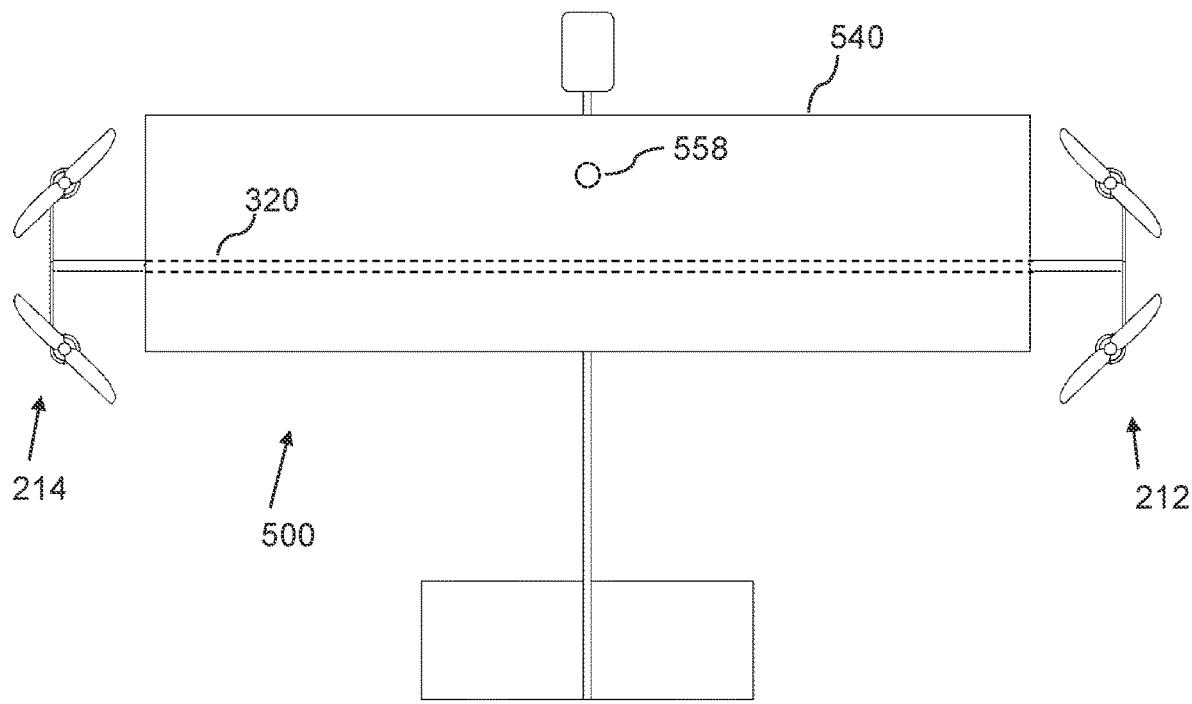
FIG. 5 is a top view of a rotatable thruster aircraft, according to an embodiment of the invention.

In a further related embodiment, the rotatable shaft 320 can be mounted above a wing 140 (as shown in FIGS. 1A-1D), below, or within a wing 440, 540 (as shown in FIGS. 4 and 5). The rotatable shaft 320 can be laterally mounted in any predetermined position along a chord of the wing 440, 540, to adjust aerodynamic stability.

In a further related embodiment, the rotatable thruster aircraft can be configured such that a main body is passively stabilized by gravity and/or relative wind.

In yet another related embodiment, as shown in FIG. 1A, the rotatable thruster aircraft 100 can be configured such that a main body 220 is configured with a center of mass 258 (of the rotatable thruster aircraft 100), which is offset from the axis of rotation 263 of the rotatable thruster assemblies 212, 214, such that the main body 220 is configured to be in an upright position, when the main body 220 is rotated by gravity to a position with the center of mass in a lowest position, such that the center of mass 258 is below the axis of rotation 263 of the rotatable thruster assemblies 212, 214.

In a related embodiment, as shown in FIG. 4, the rotatable thruster aircraft 400 can be configured with the torsion axle 320 rotatably and twistably mounted at least partially inside a wing 440 of the rotatable thruster aircraft 400

In a related embodiment, as shown in FIG. 5, the rotatable thruster aircraft 500 can be configured, such that the rotatable shaft/torsion axle 320 can be positioned rearward of the center of mass 558 of the rotatable thruster aircraft 500, which ensures additional lifting surface is positioned forward of the rotatable shaft/torsion axle 320, whereby the aircraft hangs in a nose down position during stationary or near stationary hover. The nose down position brings the center of mass rearward to a place where the forward and rearward horizontal surfaces have more equal/equal mechanical advantages in tailwinds. This configuration resolves a general issue passively stabilized airframes 235, which tend to have pitching movements when the aircraft has the tail pointing into windy conditions during hover, due to the fact that the horizontal surface area behind the center of mass has more mechanical advantage than the area forward of the center of mass on any aircraft that is statically pitch stable.

In an embodiment, as shown in FIGS. 1A, 1B, 1C, and 1D, a rotatable thruster aircraft 100 can include:
 a) an airframe 235, which can include at least one fixed wing 140 and an aircraft body 220;
 b) a rotatable torsion bar structure 105, which is rotatably connected to the airframe 235, wherein at least right and left outer portions of the rotatable torsion bar structure 105 are configured with a torsional flexibility;
 c) at least one right rotatable thruster assembly 212, comprising:
  a right rotatable structure 242, which is rotatably connected to a right side of the rotatable torsion bar structure 105;
  a first right thruster 232, which is connected to the right rotatable structure 242, on a first side of an axis of rotation 282 of the right rotatable structure 242;
  a second right thruster 234, which is connected to the right rotatable structure 242, on a second side of the axis of rotation 282 of the right rotatable structure 242;
  such that the at least one right rotatable thruster assembly is rotatable via application of a first differential thrust of the first and second right thrusters;
  such that the at least one right rotatable thruster assembly 212 is rotatable 116 from a right horizontal position 292 (as shown in FIG. 1C) providing a right downward vertical thrust 162 to a right vertical position 293 (as shown in FIG. 1A) providing a right rearward horizontal thrust 152; and
 d) at least one left rotatable thruster assembly 214, comprising:
  a left rotatable structure 244, which is connected to a left side of the rotatable torsion bar structure 105; and
  a first left thruster 236, which is connected to the left rotatable structure 244, on a first side of an axis of rotation 264 of the left rotatable structure 244;
  a second left thruster 238, which is connected to the left rotatable structure 244, on a second side of the axis of rotation 264 of the left rotatable structure 244;
  such that the at least one left rotatable thruster assembly is rotatable via application of a second differential thrust of the first and second left thrusters;
  such that the at least one left rotatable thruster assembly 214 is rotatable 118 from a left horizontal position 294 (as shown in FIG. 1C) providing a left downward vertical thrust 164 to a left vertical position 295 (as shown in FIG. 1A) providing a left rearward horizontal thrust 154.

In a related embodiment, as shown in FIGS. 1A, 1B, 1C, 1D, the rotatable torsion bar structure 105 can include:
 a rotatable shaft 320, which is configured with a torsional flexibility 342, 344, 442, 444, such that the rotatable shaft functions as a torsion spring;
 wherein the at least one right rotatable thruster assembly 212 and the at least one left rotatable thruster assembly 214 are rigidly connected to opposite ends of the rotatable shaft 320, which is laterally mounted between the at least one right rotatable thruster assembly 212 and the at least one left rotatable thruster assembly 214. A rotatable shaft 320, which is configured with a torsional flexibility 342, 344, can for example be made from glass fiber or carbon fiber, or a suitable composite material.

In another related embodiment, as shown in FIGS. 2A, 2B, 2C, the rotatable torsion bar structure 105 can include:
 a) a rotatable shaft 420, which is rotatably connected to the airframe 235, such as the wing 140 as shown;
 b) a right spring 352; and
 c) a left spring 354;
 wherein the at least one right rotatable thruster assembly 212 and the at least one left rotatable thruster assembly 214 are rotatably connected 346, 348 to the rotatable shaft 420;
 wherein the right spring 352 and the left spring 354 are mounted to the rotatable shaft 420 and respectively the right rotatable thruster assembly 212 and the left rotatable thruster assembly 214, such that the right spring 352 and the left spring 354 dampen rotation of respectively the right rotatable thruster assembly 212 and the left rotatable thruster assembly 214, such that outer ends of the rotatable torsion bar structure 105 are configured with torsional flexibility 346, 348.

FIGS. 6 and 7 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 6 and 7 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the aircraft control unit 642 are to be interpreted in the most general manner.

For example, the processor 702 can include a single physical microprocessor or microcontroller, a cluster of processors, a datacenter or a cluster of datacenters, a computing cloud service, and the like.

In a further example, the non-transitory memory 704 can include various forms of non-transitory storage media, including random access memory and other forms of dynamic storage, and hard disks, hard disk clusters, cloud storage services, and other forms of long-term storage. Similarly, the input/output 706 can include a plurality of well-known input/output devices, such as screens, keyboards, pointing devices, motion trackers, communication ports, and so forth.

Furthermore, it shall be understood that the aircraft control unit 642 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the rotatable thruster aircraft 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A rotatable thruster aircraft, comprising:
   a) an airframe;
   b) at least one right rotatable thruster assembly, comprising:
      a right rotatable structure, which is rotatably connected to the airframe on a right side of a longitudinal axis of the rotatable thruster aircraft;
      a first right thruster, which is connected to the right rotatable structure on a first side of an axis of rotation of the right rotatable structure; and
      a second right thruster, which is connected to the right rotatable structure on a second side of the axis of rotation of the right rotatable structure;
      such that the at least one right rotatable thruster assembly is rotatable via application of a first differential thrust of the first and second right thrusters;
      such that the at least one right rotatable thruster assembly is rotatable from a right horizontal position providing a right downward vertical thrust to a right vertical position providing a right rearward horizontal thrust;
   c) at least one left rotatable thruster assembly, comprising:
      a left rotatable structure, which is rotatably connected to the airframe on a left side of the longitudinal axis of the rotatable thruster aircraft;
      a first left thruster, which is connected to the left rotatable structure on a first side of an axis of rotation of the left rotatable structure; and
      a second left thruster, which is connected to the left rotatable structure on a second side of the axis of rotation of the left rotatable structure;
      such that the at least one left rotatable thruster assembly is rotatable via application of a second differential thrust of the first and second left thrusters;
      such that the at least one left rotatable thruster assembly is rotatable from a left horizontal position providing a left downward vertical thrust to a left vertical position providing a left rearward horizontal thrust; and
   d) a rotatable shaft;
   wherein the at least one right rotatable thruster assembly and the at least one left rotatable thruster assembly are non-rotatably connected to opposite ends of the rotatable shaft, which is laterally mounted between the at least one right rotatable thruster assembly and the at least one left rotatable thruster assembly;
   wherein at least outer portions of the rotatable shaft are independently twistable, such that the rotatable shaft functions as a torsion spring;
   wherein the at least one right rotatable thruster assembly is configurable with a first direction vertical twist from a vertical orientation, and the at least one left rotatable thruster assembly is configurable with a symmetrical opposite second direction vertical twist from the vertical orientation, such that the at least one right rotatable thruster assembly and the at least one left rotatable thruster assembly provide a roll movement of the rotatable thruster aircraft; and
   wherein the at least one right rotatable thruster assembly is configurable with a first direction horizontal twist from a horizontal orientation, and the at least one left rotatable thruster assembly is configurable with a symmetrical opposite second direction horizontal twist from the horizontal orientation, such that the at least one right rotatable thruster assembly and the at least one left rotatable thruster assembly provide a yaw movement of the rotatable thruster aircraft.

2. The rotatable thruster aircraft of claim 1, wherein the airframe further comprises at least one fixed wing, such that the right rotatable structure and the left rotatable structure each are rotatably connected to the at least one fixed wing.

3. The rotatable thruster aircraft of claim 1, wherein each thruster of the at least one right rotatable thruster assembly and the at least one left rotatable thruster assembly is a rotor.

4. The rotatable thruster aircraft of claim 1, further comprising an aircraft control unit, which is mounted in the airframe, wherein the aircraft control unit is configured to control a specific power applied for each thruster in the at least one right rotatable thruster assembly and the at least one left rotatable thruster assembly.

5. The rotatable thruster aircraft of claim 4, wherein the aircraft control unit further comprises:
   a) a processor;
   b) a non-transitory memory;
   c) an input/output component; and
   d) a power manager, which is configured to control the specific power applied for each thruster in the at least one right rotatable thruster assembly and the at least one left rotatable thruster assembly; all connected via
   e) a data bus.

6. The rotatable thruster aircraft of claim 1, wherein the rotatable shaft is positioned rearward of a center of mass of the rotatable thruster aircraft.

7. The rotatable thruster aircraft of claim 1, further comprising:
   an inertial measurement unit, which is connected to the rotatable shaft;
   such that the inertial measurement unit is configured to measure a position of the rotatable shaft.

8. The rotatable thruster aircraft of claim 1, further comprising:
   an inertial measurement unit, which is connected to a selected rotatable thruster assembly of the at least one right rotatable thruster assembly and the at least one left rotatable thruster assembly;
   such that the inertial measurement unit is configured to measure a position of the selected rotatable thruster assembly.

9. The rotatable thruster aircraft of claim 1, further comprising:
   a right spring; and
   a left spring;
   wherein the right spring and the left spring are mounted to the rotatable shaft and respectively the right rotatable thruster assembly and the left rotatable thruster assembly, such that the right spring and the left spring dampen rotation of respectively the right rotatable thruster assembly and the left rotatable thruster assembly.

10. The rotatable thruster aircraft of claim 1, wherein the airframe further comprises at least one fixed wing, wherein the rotatable shaft is mounted above the at least one fixed wing.

11. The rotatable thruster aircraft of claim 1, wherein a center of mass of the rotatable thruster aircraft is offset from an axis of rotation of the at least one right rotatable thruster assembly and the at least one left rotatable thruster assembly, such that the rotatable thruster aircraft is configured to be in an upright position, when the rotatable thruster aircraft is rotated by gravity to a position with the center of mass in a lowest position, such that the center of mass is below the axis of rotation of the at least one right rotatable thruster assembly and the at least one left rotatable thruster assembly.

12. A rotatable thruster aircraft, comprising:
   a) an airframe;
   b) a rotatable torsion bar structure, which is rotatably connected to the airframe, wherein at least right and left outer portions of the rotatable torsion bar structure are independently twistable;
   c) at least one right rotatable thruster assembly, comprising:
      a right rotatable structure, which is connected to a right side of the rotatable torsion bar structure;
      a first right thruster, which is connected to the right rotatable structure on a first side of an axis of rotation of the right rotatable structure; and
      a second right thruster, which is connected to the right rotatable structure on a second side of the axis of rotation of the right rotatable structure;
      such that the at least one right rotatable thruster assembly is rotatable via application of a first differential thrust of the first and second right thrusters;
      such that the at least one right rotatable thruster assembly is rotatable from a right horizontal position providing a right downward vertical thrust to a right vertical position providing a right rearward horizontal thrust; and
   d) at least one left rotatable thruster assembly, comprising:
      a left rotatable structure, which is connected to a left side of the rotatable torsion bar structure;
      a first left thruster, which is connected to the left rotatable structure on a first side of an axis of rotation of the left rotatable structure; and
      a second left thruster, which is connected to the left rotatable structure on a second side of the axis of rotation of the left rotatable structure;
      such that the at least one left rotatable thruster assembly is rotatable via application of a second differential thrust of the first and second left thrusters;
      such that the at least one left rotatable thruster assembly is rotatable from a left horizontal position providing a left downward vertical thrust to a left vertical position providing a left rearward horizontal thrust;
   wherein the at least one right rotatable thruster assembly is configurable with a first direction vertical twist from a vertical orientation, and the at least one left rotatable thruster assembly is configurable with a symmetrical opposite second direction vertical twist from the vertical orientation, such that the at least one right rotatable thruster assembly and the at least one left rotatable thruster assembly provide a roll movement of the rotatable thruster aircraft; and
   wherein the at least one right rotatable thruster assembly is configurable with a first direction horizontal twist from a horizontal orientation, and the at least one left rotatable thruster assembly is configurable with a symmetrical opposite second direction horizontal twist from the horizontal orientation, such that the at least one right rotatable thruster assembly and the at least one left rotatable thruster assembly provide a yaw movement of the rotatable thruster aircraft.

13. The rotatable thruster aircraft of claim 12, further comprising an aircraft control unit, which is mounted in the airframe, wherein the aircraft control unit is configured to control a specific power applied for each thruster in the at least one right rotatable thruster assembly and the at least one left rotatable thruster assembly.

14. The rotatable thruster aircraft of claim 12, wherein the rotatable torsion bar structure comprises:
   a rotatable shaft, wherein at least right and left outer portions of the rotatable shaft are independently twistable, such that the rotatable shaft functions as a torsion spring;
   wherein the at least one right rotatable thruster assembly and the at least one left rotatable thruster assembly are non-rotatably connected to opposite ends of the rotatable shaft, which is laterally mounted between the at least one right rotatable thruster assembly and the at least one left rotatable thruster assembly.

15. The rotatable thruster aircraft of claim 12, wherein the rotatable torsion bar structure comprises:
   a) a rotatable shaft, which is rotatably connected to the airframe;
   b) a right spring; and
   c) a left spring;
   wherein the at least one right rotatable thruster assembly and the at least one left rotatable thruster assembly are rotatably connected to the rotatable shaft;
   wherein the right spring and the left spring are mounted to the rotatable shaft and respectively the right rotatable thruster assembly and the left rotatable thruster assembly, such that the right spring and the left spring dampen rotation of respectively the right rotatable thruster assembly and the left rotatable thruster assembly.

\* \* \* \* \*